United States Patent [19]
Yamada et al.

[11] Patent Number: 5,638,537
[45] Date of Patent: Jun. 10, 1997

[54] CACHE SYSTEM WITH ACCESS MODE DETERMINATION FOR PRIORITIZING ACCESSES TO CACHE MEMORY

[75] Inventors: Akira Yamada; Masayuki Hata; Hiromasa Nakagawa; Koichi Nishida, all of Itami, Japan

[73] Assignee: Mitsubishi Denki Kabushiki Kaisha, Tokyo, Japan

[21] Appl. No.: 690,401

[22] Filed: Jul. 25, 1996

Related U.S. Application Data

[63] Continuation of Ser. No. 10,697, Jan. 29, 1993, abandoned.

[51] Int. Cl.$^6$ ............................................. G06F 113/16
[52] U.S. Cl. .......................... 395/494; 395/446; 395/450; 364/DIG. 1
[58] Field of Search ................................. 395/425, 250, 395/325, 494, 446, 450, 452, 453, 495; 364/DIG. 1

[56] References Cited

U.S. PATENT DOCUMENTS

| | | | |
|---|---|---|---|
| 4,502,110 | 2/1985 | Saito | 395/450 |
| 4,646,237 | 2/1987 | Allen | 395/287 |
| 4,831,581 | 5/1989 | Rubinfeld | 395/250 |
| 4,897,783 | 1/1990 | Nay | 395/471 |
| 4,989,140 | 1/1991 | Nishimukai et al. | 395/417 |

OTHER PUBLICATIONS

M33245 (M32/CCM) "Nikkei Data Pro. Micro Processor", Sep., 1990, MC6–364–381.

*Primary Examiner*—Tod R. Swann
*Assistant Examiner*—J. Peikari
*Attorney, Agent, or Firm*—Lowe, Price, LeBlanc & Becker

[57] ABSTRACT

A cache memory operates in a first mode, in which a cache hit occurs, and in a second mode, in which a cache miss occurs. A data processor operates in a first state in which instructions are accessed from memory and in a second state in which data is accessed from memory. Cache memory has a condition setting circuit which distinguishes instruction caching from a data caching. The processor sends an access-type signal which is compared with the access-type set in the condition setting circuit. When the access-type signal does not coincide with the contents of the condition setting circuit, a third state is declared which links the main memory and cache memory.

15 Claims, 9 Drawing Sheets

CACHE SYSTEM WITH ACCESS MODE DETERMINATION FOR PRIORITIZING ACCESSES TO CACHE MEMORY

This application is a continuation of application Ser. No. 08/010,697, filed Jan. 29, 1993, now abandoned.

BACKGROUND OF THE INVENTION

1. Field of the Invention

The present invention relates to cache memory and a cache system, and more specifically to a cache memory and a cache system for realizing quick access, and particularly to improvement of its system buses.

2. Description of the Related Art

A buffer storage (hereinafter referred to as a cache memory) has appeared as effective means for realizing quick access to main memory to meet the needs of a high-speed modern microprocessor. A microprocessor requires the main memory have, relatively, a large capacity so as to store programs and data. Performance of et system using a microprocessor is largely influenced by access time to main memory. Therefore it is desirable to shorten memory access time. However, recently, need to shorten memory access time has exceeded improvement of performance of DRAM (Dynamic Random Access Memory) chips used generally in main memory.

Not only the performance of the DRAM chips, but the enlargement and diversification of a system's size, such as multiprocessor systems consisting of a plural number of microprocessors, requires complicated bus control, and hence, it becomes difficult to shorten the memory access time.

In order to solve the above-mentioned problems, one may use a hierarchical memory. A cache memory system is one of the ways to make this hierarchical memory. This cache memory system includes a quick-access cache memory and the main memory. Cache memroy is provided between the micro-processor and the main memory to realize the quick-access of the main memory equivalently by accessing the cache memory.

FIG. 1 is a view schematically showing a configuration of a conventional cache system. In FIG. 1, the cache memory system comprises, a data processor 1 consisting of a microprocessor, a cache memory 2 for buffering the memory access of the data processor 1, a main memory 3 as the main memory of the cache memory system and a bus driver circuit 4 for controlling the bus connections between the data processor 1, cache memory 2 and main memory 3.

The cache memory 2 stores a part (copy) of memory contents of the main memory 3, and when a copy of data requested to be accessed is not stored in cache memroy, the response to a read access from the data processor 1, results in generating and giving a cache-miss signal 5 to the bus driver circuit 4. Buses 10a and 10b include a data bus, an address bus and a control bus for transmitting control signals (read/write instruction signals etc.). The operation is described in the following.

The cache memory system is one in which, responsive to the request from the data processor 1, data of an area which is used frequently in the main memory 3 is stored in the cache memory 2, which is quick-access buffer storage, and upon request from the data processor 1, the requested data is read and written rapidly from cache in lieu of from the main memory 3.

The cache memory 2 does not store fixed data, but responsive to requests from the data processor 1, the stored area of the main memory 3 stored in cache memory changes. Thus, data which is fetched from the main memory 3 and stored in the cache memory 2 responsive to the request from the data processor 1 has a good chance of being accessed for a while thereafter. Thereby, once the data of the main memory 3 is stored in the cache memory 2, the effect of the cache memory as quick-access memory is exhibited and the no-wait memory access of the data processor 1 is realized.

When the data processor requests data, first, it accesses to the cache memory and tries to read the data. At this time, if the main memory 3 has not been accessed in the area requested hitherto, data has never been transferred to the cache memory 2 from the main memory 3. There is thus no data to access in the cache memory 2. A case where the requested data is not present in the cache memory 2 is called a cache miss, while a case where the requested data is present in the cache memory is called a cache hit. Since the cache memory 2 has caused the cache miss, it generates and gives a cache miss signal 5 to the bus driver circuit 4. Responding to the cache-miss signal 5, the bus driver circuit 4 connects the bus 10a and the bus 10b. By this bus connection, the bus driver circuit 4 passes address information and a read instruction signal from the cache memory 2 to the main memory 3 via the bus 10b.

The main memory 3, by the signal and address given via the bus driver circuit 4, reads the requested data and gives it to the data processor 1 under control of the bus driver circuit 4. At this time, a block including the requested data and having a predetermined size is stored in the corresponding area of the cache memory 2. In some cases, data requested by the data processor 1 is taken in parallel with the data block which is written into the cache memory 2, and sometimes data transferred at the end, after writing the desired data block into the cache memory 2, the requested data is given to the data processor 1. Furthermore, there is an operating configuration wherein data requested in the beginning is given to the data processor, and then the data block to which this requested data belong is written into the cache memory 2. At this time, since the data processor 1 only takes in one-word data and the cache memory 2 writes the block including the requested data, at the time of writing data into the cache memory 2, the data processor 1 is held in a waiting state under control from the bus driver circuit 4.

When the data processor 1 receives the requested data in a unit of block, data are transferred in parallel and simultaneously to the data processor 1 and the cache memory 2. That is, the bus driver circuit 4, responding to the cache-miss signal 5, judges that the data block including the data requested from the main memory 3 must be sent, and controls the data transfer of this data block (this is usually decided by a tag address). When the above-mentioned operation is repeated and a certain extent of data are cached in the cache memory 2 (data copy of the main memory 3 is stored in the cache memory 2), even when the data processor 1 accesses the cache memory 2, the probability the requested data is stored in the cache memory 2 is high. In this case, the requested data is outputted from the cache memory 2 and transmitted to the data processor 1. At this time, since the cache-miss signal 5 is not generated, the bus driver circuit 4 separates the bus 10a and the bus 10b.

By accessing to the quick-access cache memory 2 at the time of cache hit in such a manner, the data processor 1 can access the memory rapidly, thereby the data processor 1 is able to operate rapidly without deteriorating its processing speed and the cache system itself can operate rapidly.

The aforementioned operation is similar in the case of writing the processing result into the main memory 3 by the data processor 1, and when data of the address requested to be accessed by the data processor 1 is held in the cache memory 2, the content requested to he accessed is rewritten by new data. At this time, the content of the main memory 3 is also rewritten by new data. As a data rewriting system of the main memory 3, there is a write-back system in which, after a block in the main memory 3 corresponding only to occurrence of cache miss, or the data block in the main memory 3 including the address to be rewritten is transferred to the cache memory 2, the data is rewritten only in the cache memory 2. Also, there is a write through system in which, at the time of cache hit, data in the cache memory 2 of the address requested to be rewritten and data in the main memory 3 are rewritten, and at the time of cache miss, only data to the address requested to be accessed in the main memory 3 is written.

As stated above, by providing a buffering quick-access cache memory 2 between the main memory 3 and the data processor 1, and accessing the cache memory 2, the data processor 1 can access data rapidly, and as a result, a quick processing can he executed.

However, when an address space required by the data processor 1 becomes larger, capacity of the main memory 3 also increases inevitably. In this case, when only one cache memory 2 of small capacity is used, a memory area of the cached main memory 3 becomes relatively smaller and the cache hit ratio is decreased, thereby the effect of highspeed cache memory system is spoiled. At this time, though the cache memory capacity may be increased, since the quick-access cache memory is expensive, increase in capacity of the expensive cache memory further pushes up the cost, resulting in a high system cost.

In order to solve such problems, it is considered to adopt a multi-cache system which constitutes a large capacity cache system, by using a plural number of small capacity cache memories and caching the different address areas of the main memory 3 by the individual cache memories.

FIG. 2 is a block diagram showing an example of configuration of the above-mentioned multi-cache system. In FIG. 2, the multi-cache system includes, in addition to the data processor 1, the main memory 3 and the bus driver circuit 4, first and second cache memories 2a and b whose address areas in the main memory 3 to be cached are different, a first logic circuit a for generating a cache-miss signal, and a second logic circuit 8 for generating a non-cachable area signal.

The first cache memory 2a generates the first cache-miss signal 5a and the first non-cachable signal 9a. The second cache memory 2b generates the second cache-miss signal 5b and the second non-cachable area signal 9b.

The first logic circuit 7 consists of an "OR" circuit which receives the first and second cache-miss signals 5a, 5b, generates a third cache-miss signal 5c indicating that the cache miss occurs in the cache memory 2 (the cache memory consisting of the first and second cache memories 2a, 2b) when either the first cache-miss signal 5a or second cache-miss signal 5b is generated, and gives it to the bus driver circuit 4.

The second logic circuit 8 consists of an "AND" circuit which receives the first non-cachable area signal 9a and the second non-cachable area signal 9b, generates a third non-cachable area signal 9c indicating that the non-cachable area of the cache memory 2 is accessed, when both the first and second non-cachable area signals 9a and 9b are generated, and gives it to the bus driver circuit 4.

The first and second cache memories 2a and 2b cache address areas as shown in FIG. 3.

In FIG. 3, the main memory 3 includes four address areas A, B, C, and D. The address area A is the address area whose most significant side two bits of the address are "00", the address area B is the address area whose most significant side two bits of address are "01", the address area C is the address area whose most significant side two bits of the address are "10", and the address area D is the address area whose most significant side two bits of the address are "11". These address areas may be either physical spaces or logical spaces.

The first cache memory 2a caches data in this address area B and the second cache memory 2b caches data in the address area D. For judging whether the address areas are its own cachable areas or not, the first and second cache memories 2a and 2b respectively include comparing circuits, which compare the most significant side two bits of the address with values of the most significant side two bits in the address ares allocated to themselves, and detect the conformity and nonconformity. When the address requested to be accessed is the address outside the area allocated to themselves, the comparing circuits generate the non-cachable area signals 9a or 9b.

Next, the operation of the prior art is described.

The first cache memory 2a caches data when the most significant side two bit of the address are "01", and the second cache memory 2b caches data when the most significant side two bits of the address are "11". That is, in a 32-bit address space, the address space of address 40000000H to 7FFFFFFFH (H represents a hexadecimal notation) is a cache space for the first cache memory 2a, and the address space of address C0000000H to FFFFFFFFH is a cache space for the second cache memory 2b.

In such an environment, when the data processor 1 accesses the address 40000000H, this address is given to the first and second cache memories 2a and 2b in parallel. Since this address is in its own cachable area, the first cache memory 2a does not generate the non-cachable area signal 9a. Subsequently, when the first cache memory 2a judges that this address is in its own caching area, it checks whether there is a data copy of the address accessed to itself. As a result, when there is no copy, it is judged to be a cache miss and the cache-miss signal 5a is generated.

The first logic circuit 7 generates the third cache-miss signal 5c responding to the first cache-miss signal 5a and gives it to the bus driver circuit 4. Meanwhile, since the first non-cachable area signal 9a is not generated, the second logic circuit 8 does not generate the third non-cachable area signal 9c.

Responding to the states of the third cache-miss signal 5c and the third non-cachable area signal 9c, the bus driver circuit 4 judges that, though address in the cachable area is accessed the cache miss occurs in the cache memory 2, and connects the bus 10a and the bus 10b. Responding to the third cache-miss signal 5c, the bus driver circuit 4 accesses the corresponding address data of the main memory 3, transfers a block including the data of accessed address to the first cache memory 2a, and transmits data requested to be accessed to the data processor 1. Data transfer to the data processor 1 may be made after or before transferring the data block to the first cache memory 2a, or the data block may be transferred to the data processor 1.

When the second cache memory 2b is generating the cache-miss signal 5b, it is similar to the above-mentioned operation, the second cache memory 2b and the main memory 3 are connected to transfer the data block.

When the data processor 1 accesses the address 80000000H, the first cache memory 2a compares the accessed address with the address area allocated to itself, and judges whether the address requested to be accessed is in the cachable area or not. In this case, since the address 80000000H is in the non-cachable area for both the first and second cache memories 2a and 2b, the first and second non-cachable area signals 9a and 9b are generated respectively.

When the first and second non-cachable area signals 9a and 9b are generated, in the first and second cache memories 2a and 2b, it is not necessary to judge whether there is a corresponding address copy therein or not, and the cache-miss signals 5a and 5b are not generated. Thus, in this case, the third non-cachable area signal 9c is generated by the second logic circuit 8, while the third cache-miss signal 5c is not generated.

Responding to the generated non-cachable area signal 9c, the bus driver circuit 1 connects the bus 10a and bus 10b and merely transfers data of the address 80000000H requested to be accessed by the data processor 1 to the data professor 1. Since the cache-miss signal 5c is not generated at this time, the bus driver circuit 4 merely controls the operation of transferring of one-word data such that the block transferring operation to the cache memories 2a or 2b does not occur (only when the data block is not received by the data processor).

The above-mentioned cache judging operation is performed similarly at the time of writing data.

By providing a plural number of cache memories and allocating independent cachable a the cache memories as mentioned hereinabove, consequently, the cache memory capacity can be increased by using the caches memories of small-capacity and the cache hit ratio and system performance can be improved.

As mentioned above, for example, by utilizing the difference between a locality of access of the program instruction sequence and a locality of data access and by allocating respective address areas to the cache memories, the cache hit ratio in a large-capacity address space can be improved using the small-capacity cache memories.

However, each of the cache memories can only judge whether a given address is in its own non-cachable area or not, and it can not judge whether it is in a comprehensive cachable area in the cache memory system or not, and also each of the cache memories is not able to know which address area is allocated to the other cache memories. Thus, when designing the system, the address areas must be allocated to the cache memories such that the cachable areas of the respective cache memories do not duplicate. For this end, it is necessary to analyze the data arrangement structure in an address space of the main memory and allocate the most efficient address area, resulting in a long analyzing time.

For judging whether the given address is in the own cachable area or not, the cache memory has to compare addresses therein. And hence, when the number of cache memories increases, naturally the number of address bits to be compared increases. It takes a long time (for example 27 ns) to judge that it is cachable by this comparison, and judging whether cache hit or not is done after the result of judging whether cachable or not, so that quick accessibility of the cache memory is degraded.

The bus driver circuit 4 needs to receive all the non-cachable area signals through the one-stage logic circuit (second logic circuit 8), till it judges that all of the cache memories are generating the non-cachable area signals, therefore, it takes a long time for the bus driver circuit 4 to connect the data processor 1 and the main memory 3 responding to the output of the second logic circuit 8, and hence, the high-speed operability of the system is deteriorated.

In the case of conventional multi-cache system having the configuration as shown in FIG. 2 as described above, when the cachable areas are allocated to the cache memories and access of the data processor 1 and the main memory 3 is controlled by the bus driver circuit 4, on the basis of the cachable judging result from the all cache memories, usually, the wait time required in case of accessing of the main memory 3 by the data processor 1 in a signal cache system is further lengthened, and the quick accessibility of the cache memory system is spoiled.

SUMMARY OF THE INVENTION

It is a primary object of the present invention to provide a cache memory and a cache system capable of functioning a bus driver rapidly, even when a multi-cache system is constructed.

The cache memory according to the present invention, responding to data read access or instruction read access executed by a data processor, operates in a first mode when holding a copy of data or instruction to be accessed, whereby the data or instruction is outputted to the data processor, and when not holding, operates in a second mode, whereby a main memory is accessed to store the data and instruction to be accessed and to read by the data processor. The cache memory according to the present invention is able to operate further in a third mode, which is different from the above-mentioned first and second modes.

A cache memory according to a first embodiment is such that, an access type of the data processor which becomes a first state to be operated in the first mode and a second state to be operated in the second mode is set, and when an access different from this type is executed by the data processor, it becomes a third state and outputs a predetermined signal.

A cache system according to a second embodiment is a system incorporating the first cache memory as mentioned above, and when the cache memory becomes the third state and outputs the predetermined signal, the bus driver connects the main memory and cache memories.

A cache memory according to a third embodiment reflects the case where a plural number of cache memories of the first embodiment are used, and each of the cache memories is constituted in the same way as those of the first embodiment. The third embodiment includes means for designating the access type of the data processor and different access types can be set to respective cache memories.

A cache system according to a fourth embodiment incorporates a plural number of cache memories of the third embodiment as mentioned above, and when one of the cache memories detects that the entire system is in the third state it outputs a predetermined signal and the bus driver connects the main memory and cache memories.

A cache system according to a fifth embodiment includes means for judging whether or not the combination of access types of the data processor set in respective plural cache memories is appropriate as a whole, whereby collisions between buses are avoided.

The above and further objects and features of the invention will more fully be apparent from the following detailed description with accompanying drawings.

DESCRIPTION OF THE PREFERRED EMBODIMENTS

Figure 4:
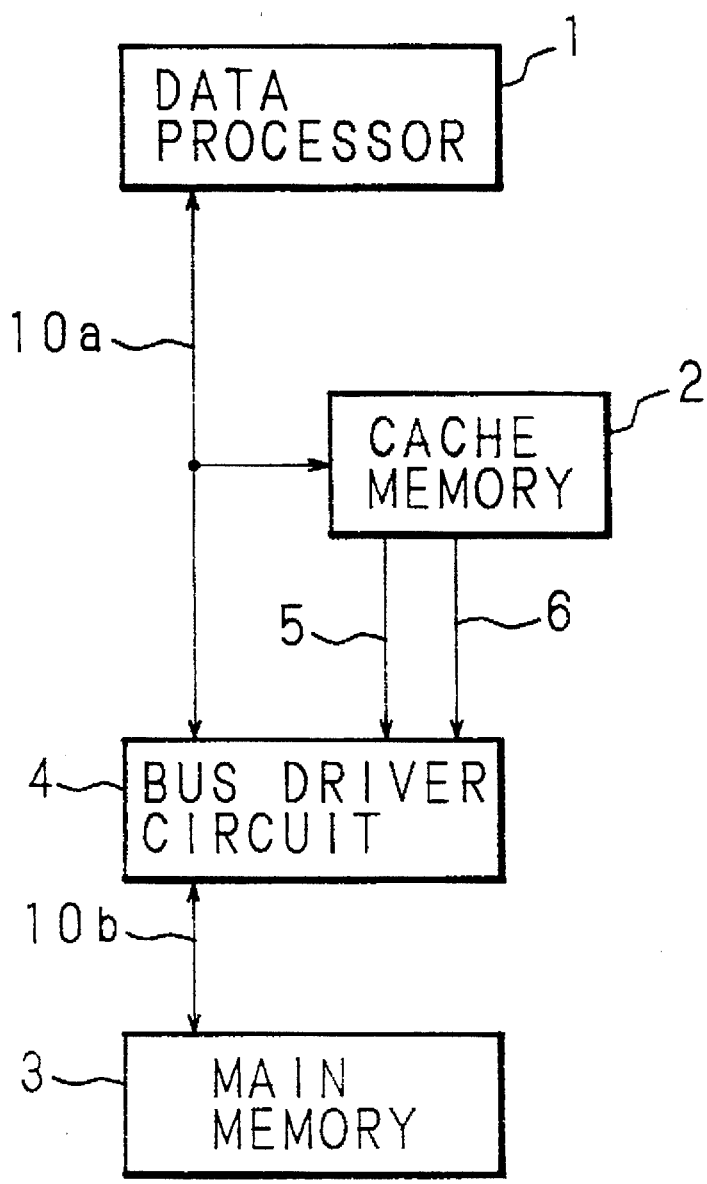
FIG. 4 is a block diagram showing an example of a configuration of a single cache system according to present invention.

FIG. 4 is a block diagram showing a configuration of a system using a cache memory which is one embodiment of the present invention. In FIG. 4, a cache memory system comprises, for example, a data processor 1 consisting of a microprocessor, a main memory 3 as a main memory of the cache memory system, a bus driver circuit 4 which controls a bus 10a and a bus 10b and a cache memory 2 which buffers a memory access of the data processor 1.

Responding to access from the data processor 1, the cache memory 2 generates a cache-miss signal 5 when there is no copy of the main memory therein. The cache memory 2 also generates a third operating state signal 6, when neither the cache-hit operation nor the cache-miss operation is performed responding to the read access from the data processor 1.

Hereupon, "the third operating state" is the operation which performs neither a first operation, which outputs data requested to he accessed by the data processor 1, when a copy of the main memory 3 is present in the cache memory 2, responding to read access from the data processor 1, nor a second operation, which accesses data requested to be accessed by the data processor 1 to the main memory 3 and stores the requested data, when the copy of main memory 3 is not present therein, responding to read access from the data processor 1. That is, the third operating state represents the operating state, wherein the operation at cache hit and the operation at cache miss are not performed responding to the read access from the data processor 1.

Next, the operation is described.

A data accessing types of the data processor 1, there are three types, an instruction fetch, a data fetch and the access which is different from the two types. The instruction fetch represents an operation which reads a program executing sequence. For example, it is the operation which reads out data in the memory having such a content as "load the content of memory address "10" into register A0 (LOAD A0 10)", in case of the program of loading the memory of address "10" into the register A0. The operation which merely reads out only the content of memory of address "10" at this time is called the data fetch.

The data processor 1 sends out a signal indicating the access type, responsive to this access type, to a control bus of the bus 10a so as to control the bus cycle efficiently. As examples of a data processor which leads out with a signal indicating such access type, there are microprocessors such as M33210, M33220 and M33230 by Mitsubishi Electric Corporation.

Now, the cache memory 2 may be set so that it only executes the caching operation when the data processor 1 executes an instruction fetch, that is, program data only of the address area storing the instructions from the main memory is stored in cache memory 2.

When the data processor 1 executes a program for te first time or executes an instruction fetch for the first time, the instruction fetch is executed against the cache memory 2. At this time, since the cache memory 2 has not fetched the data yet, there is no data accessed by the data processor 1, resulting in a cache miss. Thereby, the cache-miss signal 5 is generated and given to the bus driver circuit 4. Responding to the cache-miss signal 5, the bus driver circuit 4 connects the bus 10a and bus 10b. Thereby, information such as address having been given to the cache memory 2 is given to the main memory 3 under control of the bus driver circuit 4. The main memory 3 decodes the given address and outputs data which has been accessed to the bus 10b. The data outputted to the bus 10b is transmitted to the data processor 1 via the bus 10a under control of the bus driver circuit 4, and stored in the cache memory 2.

The data transfer to the data processor 1 and the cache memory 2 via the bus driver circuit 4 at the time of cache miss may be such that, after giving only the desired data to the data processor 1, the data block including data requested to be accessed is written into the cache memory 2, or after writing the data block including data requested to be accessed into the cache memory 2, only the desired data is given to the data processor 1. Also, when the data processor 1 has a function to receive data in a block unit, data are transferred to the data processor 1 and the cache memory 2 in parallel.

Next, the data processor 1 executes a data fetch according to the fetched instruction. Since the cache memory 2 is set to execute the caching operation only when the instruction is fetched, the caching operation is not executed responding to the data fetch from the data processor 1.

At this time, it may be constructed such that the cache memory 2 fetches an address on the bus 10a and judges the cache miss, or it may be constructed to inhibit the fetch at the address. The cache memory 2, at least, does not generate a cache-miss signal 5 but generates the third operating state signal 6, when caching responding only to the instruction fetch is set and the data processor 1 issues a data fetch command.

The bus driver circuit 4 judges that it is necessary to access the main memory 3 by the third operating state signal 6, connecting the bus 10a and 10b and gives information, such as the address outputted to the bus 10a from the data processor 1, to the main memory 3 via the bus 10b. Thereby, access between the main memory 3 and the data processor 1 is realized. At this time, since the third operating state signal 6 is generated, the bus driver circuit 4 judges that it is not necessary to transfer the data block (a block including the data to be read-accessed) to the cache memory 2, and at the time of read access, transfers only the accessed data (usually one word) to the data processor 1 from the main memory 3.

At this time of data write, the cache memory 2 generates the third operating state signal 6 similarly to the time of data read, because the caching operation is set responding to the instruction fetch.

That is, when the cache-miss signal 5 is generated, the bus driver circuit 4 must transfer the data block to the cache memory 2, so it controls the transfer of data block. Meanwhile, when the third operating state signal 6 is generated, the bus driver circuit 4 judges that it is not necessary to transfer such data block, and controls only the transfer of data requested to be accessed irrespective of accesses at the time of read/write. At this time, the data processor 1 does not receive only the one-word data, but also fetches the data block including the accessed data, though the bus driver circuit 4 performs the operation control for transferring the data block when the third operating state signal 6 is generated. At this time, the data block is not written into the cache memory 2.

It is also same at the time of data write, when the cache-miss signal 5 is generated, the bus driver circuit 4 adequately controls the operation, by the system configuration, whether to write in data by a so-called write-through method or by a write-back method. When the third operation state signal 6 is generated at the time of data write, the bus drivel circuit 4 connects the data processor 1 and the main memory 3, and only controls the data writing operation to the addressed memory location.

Figure 1:
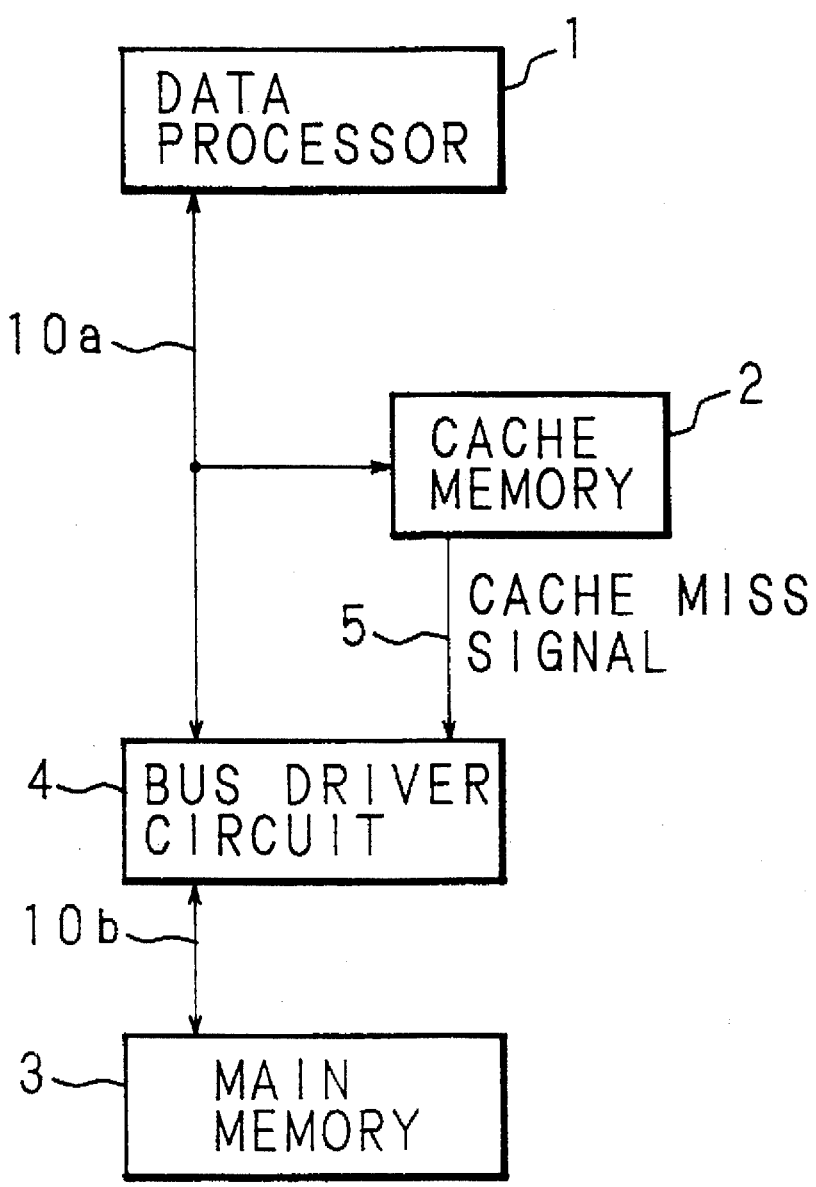
FIG. 1 is a block diagram showing an example of a configuration of a prior art single cache system.
Figure 2:
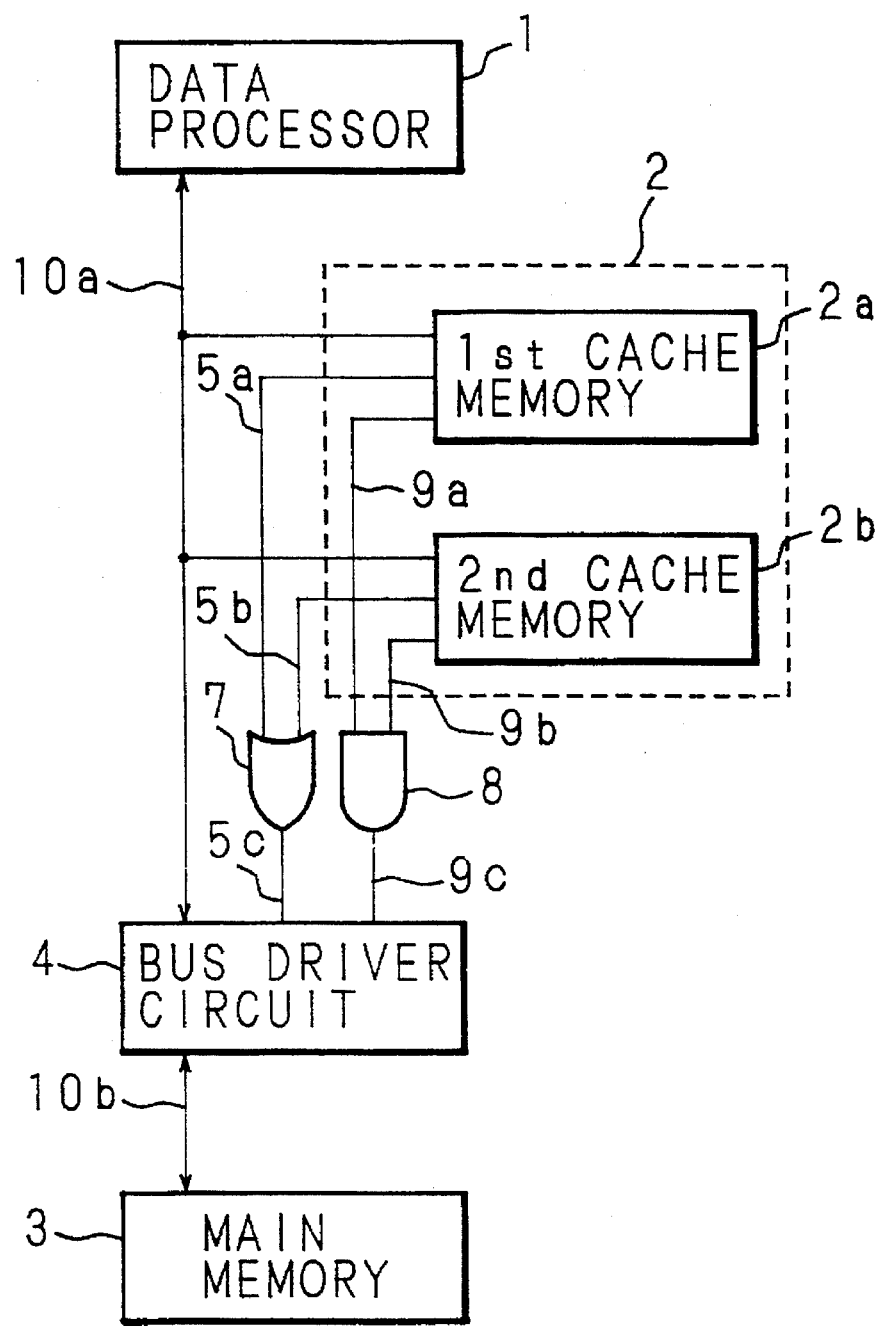
FIG. 2 is a block diagram showing can example of a configuration of a conventional multi-cache system.
Figure 3:
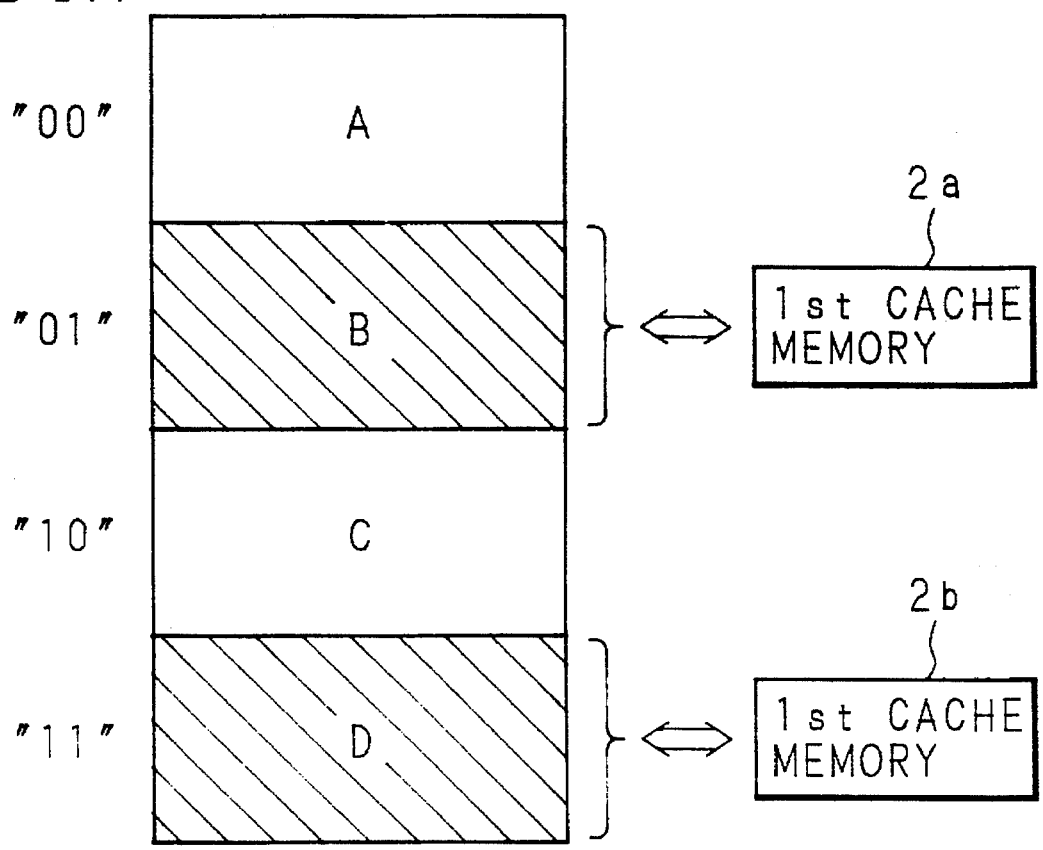
FIG. 3 is a schematic view showing address areas of a main memory allocated to respective cache memories.

In the present invention, since it is possible to judge only by a logic circuit "OR," whether cachable area is involved or not, not by setting the cachable area responding to the given address as is done in the conventional configuration shown in FIG. 2, but by setting the cachable area according to information showing the access type issued by the data processor 1 as mentioned above, the condition can be judged rapidly and high-speed control of the bus driver circuit 4 is realized.

Usually, in an address space of main memory, since areas for storing the instruction and areas for storing data are different, by setting the caching area responsive to the access type indicated by the data processor of the present invention, the cachable area can be set without setting the cachable area in the cache memories based uupon addresses. Thus, it is not necessary to analyze the program structure as to cachable area and set the address area of cache memory according to the analysis, for the cache memory 2, and the cachable area can be set easily and accurately without reference to the address areas.

In the aforesaid description, though the invention is constituted such that the cachable area in the cache memory 2 is set responsive to information showing the access type of the data processor 1, it may be constituted such that cachable area of the cache memory is set by using a ring (this is usually used to protect an OS) for identifying the OS (operating system) and a user program, or when the main memory 3 includes a bank configuration, the cachable area of the cache memory 2 may be set by using the bank address.

A function code (the code designating the user data space, user program space, system data space, system program space etc.) designating the type of bus cycles for executing address conversion for the memory control may be used. Hereupon, the system program space usually shows a supervisor program such as the OS, and such function code is used to protect the supervisor data and supervisor program.

Figure 5:
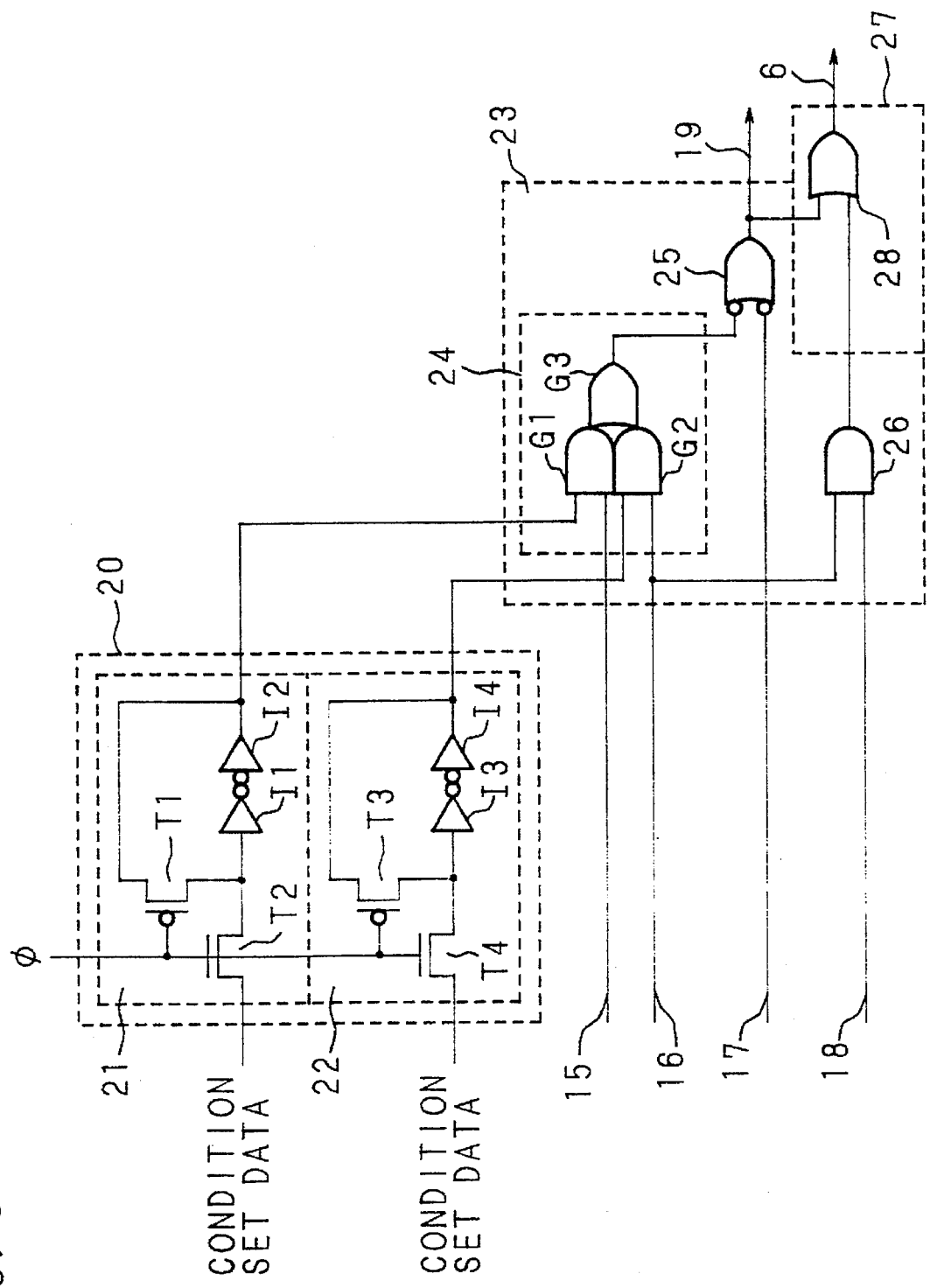
FIG. 5 is a circuit diagram showing a specific example of a configuration of a third operating state signal generating circuit, of a single cache system of the present invention.

FIG. 5 is a view showing an example of circuit configuration for generating the third operating state signal. The third operating state signal generating circuit may be incorporated in the cache memory 2 or disposed outside the cache memory 2. In the system configuration shown in FIG. 4, an example of the case where the third operating state signal generating circuit is incorporated the cache memory 2. Referring to FIG. 5, the third operation state signal generating circuit includes, a condition setting circuit 20 for setting the caching condition of the cache memory 2, an NCA judging circuit 23 which compares access type identifying information outputted by the data processor 1 and information set by the condition set circuit 20 so as to judge cachable or not, and an output circuit 2 which outputs the third operating state signal 6 responding to the output of the SCA judging circuit 23.

The condition set circuit 20 includes a first latch cycle 21 for setting instruction caching, and a second latch circuit 22 for setting data caching.

The first latch circuit 21 includes a p-channel MOS transistor (insulation-gate type field-effect transistor) T1 and an N-channel MOS transistor T2 which are controlled by a caching condition set control signal ø, and inverters I1 and I2 which are in two-stage cascade connection. Output of the inverter I2 is connected to input of the inverter I1 via the transistor T1. The transistor T2 receives condition set data in its one conduction terminal and transmits this data to an input unit of the inverter I1 responding to the control signal 0.

The second latch circuit 22 has a same configuration as the first latch circuit 91, and includes inverters I3 and I4 which are in two-stage cascade connection and a p-channel MOS transistor T3 and an N-channel MOS transistor T4 which turn into the ON state responding to the control signal ø. Condition set data is transmitted to an input unit of the inverter I3 via the transistor T4.

Condition set data input terminals of the transistors T2 and T4 may be connected to external pin terminals or connected to data registers, not shown. Then the data registers are used, the data registers are connected to the data bus of the bus 10a, and the condition set data is written into the data registers under control from the data processor 1.

The control signal ø is generated to set the caching area of the cache memory, and it may be given directly via the external pin terminal, or it may be generated in the cache memory 2 under the control from the data processor 1. Though the third operating state signal generating circuit may be disposed outside the cache memory, in the following description, only the case where it is incorporated in the cache memory 2 is described.

The NCA judging circuit 23 includes, a first logic gate 24 for detecting conformity/nonconformity of the set caching condition and the access executed by the data processor 1, a second logic gate 24 for generating a cache inhibit signal 19 responding to the output of the first logic gate 24 and a non-cachable signal 17 showing "no caching needed" outputted from the data processor 1, and a third logic gate 26 which execute AND operation of a data signal 16 showing that a bus access type, which is one of access information outputted from the data processor 1, is the data fetch and a datawrite signal 18 showing the data write outputted from the data processor 1.

The first logic gate 24 includes, a gate circuit G1 which, receiving latched data in the first latch circuit 21 and an instruction signal 15 which identifies that a bus access type which is one of access information outputted from the data processor 1 is an instruction fetch, executes AND operation of the two, a second circuit G2 which, receiving latched data in the second latch circuit 22 and a data signal 16 outputted at the time of data fetch which is one of access information outputted from the data processor 1, executes AND operation of the two for output, and a third gate circuit G3 which, receiving outputs of the first and second gate circuits G1 and G2, executes AND operation of the two for output.

The second logic gate 25, receiving the output of the third gate circuit G3 and the non-cachable signal 1a which is one of access information outputted from the data processor 1, outputs the cache inhibit signal 19 which inhibits the caching operation of the cache memory. The second logic gate 25 generates the cache inhibit signal 19 which is active when either the output of the third gate circuit G3 or the non-cachable signal 17 is in inactive state "L". The cache inhibit signal 19 outputted from the second logic gate 25 may be used to inhibit fetching of the address in the cache memory 2 itself, or may be used to inhibit the operation of the cache hit/miss judging circuit which judges the cache hit/miss by the tag memory output included in the cache memory 2. The cache inhibit signal 19 may be used such that, the cache miss signal 5 is inhibited to generate in the cache memory 2, and the cache memory 2 is inhibited to give and take data to and from the data bus on the bus 10a, its specific destination is, particularly, not restricted.

The third logic gate 26 outputs the active state signal only when the data signal 16 is in active state, the data processor 1 executes the data fetch, the data write signal 18 is in active state and access for writing data is executed.

An output circuit 27 includes a fourth logic gate 28 which receives outputs of the second logic gate 25 and the third logic gate 26 and executes OR operation of the two for output. The output circuit 27 outputs the third operating state signal 6 when the cache inhibit signal 19 is generated or the data processor 1 writes data by only one word.

Next, referring to FIG. 5, the operation of the third operating state signal generating circuit is described.

Now, supposing that "1" is written into the first latch circuit. 21 and "0" is written into the second latch circuit 22. At this time, the cache memory 2 is set to cache only when the data processor 1 executes read access of the instruction-fetch. The caching condition set operation to the condition set circuit 20 is performed by building up the control signal 0 to bring the transistors T2 and T4 to the conductive state, and giving a predetermined condition set data to the latch circuits 21 and 22.

The case where the data processor 1 executes the instruction fetch in this state is considered. At this time, an access type identifying signal obtained by making the instruction signal 15 "1" to indicate that the data access type is the instruction fetch, is outputted to the control bus on the bus 10a from the data processor 1. At this time, the data signal 16 is "0".

The gate circuit G1 has received latched data of the first latch circuit 21 and the instruction signal 15, which are both "1", so that it outputs a signal "1". When the output of either the gate circuit G1 or the gate circuit G2 is "1", the gate circuit G3 outputs the signal "1". Thus, signal "1" is outputted from the first logic gate 24.

When the data processor 1 does not want caching responding to the instruction fetch operation, the non-cachable signal 17 is "0". Thus, when the data processor 1 does not request the caching operation, the cache inhibit signal 19 outputted from the second logic gate 25 becomes "1" and the caching operation of the cache memory 2 is inhibited.

Meanwhile, when the data processor 1 requests the caching operation, the non-cachable signal 17 is made "1". Since two inputs of the logic gate 25 are both "1" at this time, the cache inhibit signal 19 is "0" and the caching operation in the cache memory 2 is executed. Thus, the cache memory 2 executes the caching operation at this time, judges the cache hit/miss and gives the cache-miss signal 5 to the bus driver circuit 4 responsive to the judging result.

Meanwhile, the third logic gate 26 receives the data signal 16 of "0", and its output is "0". Thus, the third operating state signal 6 responsive to a logic level of the cache inhibit signal 19 is outputted from the fourth logic gate 28 of the output circuit 27. That is, when the cache inhibit signal 19 is at "1" and the caching operation of the cache memory 2 is inhibited, the third operating state signal 6 becomes "1", When the third operating state signal 6 is "1", it shows that the caching operation of the cache memory 2 is inhibited, thus the bus driver circuit 4 only transfers data between the main memory 3 and the data processor 1.

On the one hand, when the cache inhibit signal 19 is "0", since the output of the third operating state signal 6 is also "0", the third operating state signal 6 is not generated and "0" is kept. This state means that the cache miss/hit is judged in the cache memory 2, and at the time of cache miss, since it is necessary to access between the cache memory 9 and the main memory 3 and between the main memory 3 and the data processor 1, the bus driver circuit 4 controls such data transfer.

When the data processor 1 fetches data, the instruction signal is becomes "0" and the data signal 16 becomes "1". Since the first and second latch circuits 21 and 22 respectively contain "1" and "0" at this time, outputs of the gate circuits G1 and G2 are both "0", thus the output of the gate circuit G3 is also "0", Thus, at this time, irrespective of the state of the non-cachable signal 17, the output of the second logic gate 25 or the cache inhibit signal 19 becomes "1" and the caching operation of the cache memory 2 is inhibited. The third operating state signal 6 also becomes "1" responding to the cache inhibit signal 19 of "1". The bus driver circuit 4 establishes access between the data processor 1 and the main memory 3 responding to the third operating state signal of "1".

When the bus access-type requested from the data processor 1 is neither the instruction fetch nor the data fetch, both the instruction signal 15 and the data signal 16 are "0", the output of the first logic gate 24 becomes 0" and the cache inhibit signal 19 becomes "1".

When the data processor 1 does not want caching irrespective of the bus access type, the non-cachable signal 17 becomes "0", the output of the second logic gate 25 becomes "1" irrespective of an output level of the first logic gate 9a, and the caching operation of the cache memory is inhibited. The third operating state signal 6 is outputted via the gate circuit 28 at this time so it becomes "1", and the data processor 1 and the main memory 3 are made accessible therebetween.

When the data processor 1 further wants to write data, the data write signal 18 is made "1" and also the data signal 16 is made "1". Hereupon, the case where the data processor 1 uses in this cache memory system writes data in a word unit is estimated.

In this case, the output of the third logic gate 26 becomes "1" and also the third operating state signal 6 becomes "1". At this time, since the cache inhibit signal 19 is so set that the cache memory 2 caches the instruction, it becomes "0".

Next, the operation of the case of setting the condition such that, the third operating state signal generating circuit 28 performs caching responding to the data fetch is described. In this case, the first latch circuit 21 latches data of "0" and the second latch circuit 22 latches data of "1".

When the instruction signal 15 is "1" and the data signal 16 is "0", a signal "0" is outputted from the first logic gate 24, the cache inhibit signal 19 becomes "1" via the second logic gate 25, and the caching operation of the cache memory is inhibited.

Next, when the instruction signal 15 is "0" and the data signal 16 is "1", a signal "1" is outputted from the first logic gate 24. In this case, when the non-cachable signal 17 is "1" and the caching is requested, the cache inhibit signal from the second logic gate 25 stays at "0" and the cache memory 2 executes the caching operation.

Meanwhile, when the non-cachable signal 17 is "0" and "no caching needed" is indicated, the cache inhibit signal 19 becomes "1" by the second logic gate 25 and the caching operation is inhibited. When the cache inhibit signal 19 has become "1", the third operating state signal 6 also becomes "1", and the main memory 3 and the data processor 1 are made accessible therebetween.

Now, considering the case where the data processor 1 accesses and requests writing data. In this case, the instruction signal 15 becomes "0", and the data signal 16 as well as the data-write signal 18 become "1". In this case, irrespective of the judging operation of the NCA judging circuit 23, the value "1" of third operating state signal 6 is outputted from the output circuit 27. When the data processor 1 generates the data signal 16 at the time of data-write operation, irrespective of the state of the cache inhibit signal 19, always the third operating state signal 6 is outputted and the data processor 1 and the main memory 3 are connected. This is because that, in this cache memory system, the data processor of a so-called write through method is assumed, and at the time of data write, it is assumed that the main memory 3 is always accessed.

In the configuration shown in FIG. 5, though the first and second latch circuits 21 and 22 are used to set the caching conditions, it may be so constructed that condition set data are given directly from the outside via pin terminals continuously, without providing the latch circuits.

The data-write signal 18 may be a signal merely showing write/read to and from the main memory 3.

Next, the configuration and operation of the case wherein a multi-cache system is constructed by using a plural number of cache memories according to the present invention are described.

Figure 6:
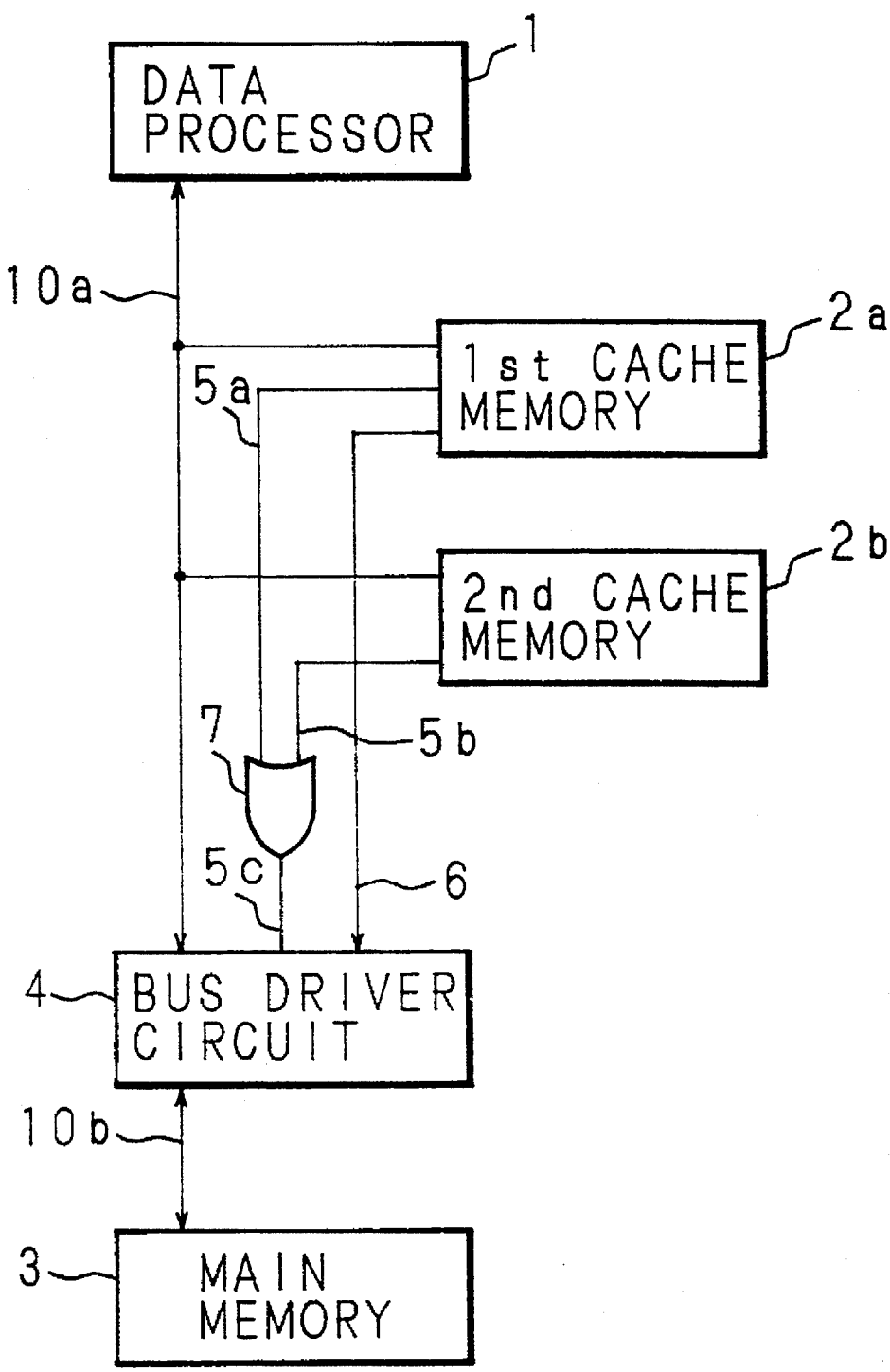
FIG. 6 is a block diagram showing a specific example of configuration of a multi-cache system of the present invention.

FIG. 6 is a view showing an example of configuration of the multi-cache system using a plural number of cache memories according to the present invention.

In FIG. 6, the multi-cache system includes a first cache memory 2a, a second cache memory 9b and a first logic circuit { which receives cache-miss signals 5a, 5b from the first and second cache memories 2a and 9b. The first and second cache memories 9a and 2b are connected to the bus 10a in parallel and their respective address areas to be cached are different. Only the third operating state signal 6 generated from the first cache memory 2a is given to the bus driver circuit 4.

The first logic circuit 7 has a same function as the conventional first logic circuit 7 shown in FIG. 2, and generates a cache-miss signal 5c showing that a cache miss has occurred in the memory system, when the cache-miss signal 5a or 5b is generated from either the first or second cache memories 2a or 2b, and gives it to the bus driver circuit 4.

In the multi-cache system shown in FIG. 6, since only the third operating state signal 6 of one cache memory is used, a circuit for setting the conditions according to the caching condition of the entire cache system, or an access set circuit is used.

Figure 7:
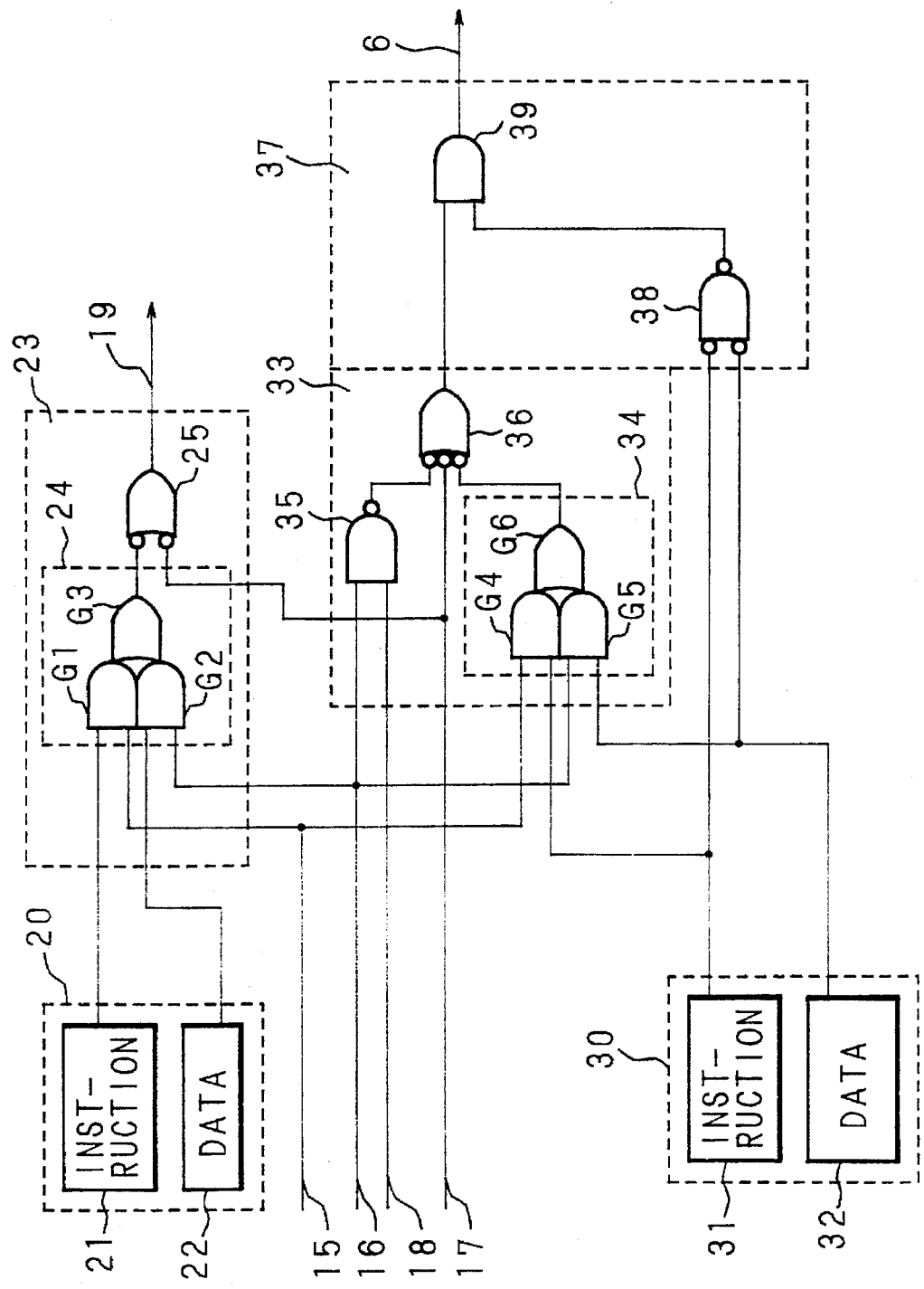
FIG. 7 is a circuit diagram showing a specific example of configuration of a third operating state signal generating circuit of a multi-cache system of the present invention.

FIG. 7 is a view schematically showing the configuration of a third operating state signal generating circuit included in the cache memory used in the multi-cache system.

The third operating state signal generating circuit may be incorporated in the cache memory or disposed outside thereof. However, when the third operating state signal generating circuit is disposed outside the cache memory, the third operating state signal generating circuit including the access set circuit is provided only for one cache memory, and for the remaining, cache memories, the third operating state signal generating circuit having a simple configuration shown in FIG. 5 may be provided, thus it is preferable from a viewpoint of system cost. However, in the following description, the third operating state signal generating circuit shown in FIG. 7 is described as incorporated in the cache memories. At this time, the third operating state signal is utilized in only one cache memory and in the remaining cache memories, this third operating state signal In FIG. 7, as same as the configuration shown in FIG. 5, the third operating state signal generating circuit includes the caching condition set circuit 20 for setting the caching condition and the NCA judging circuit 23 for judging cachable or not. The configuration and operation of the condition set circuit 20 and the SCA judging circuit 23 shown in FIG. 7 are similar to those shown in FIG. 5. The caching inhibit signal 19 is generated from the NCA judging circuit 23.

The third operating state signal generating circuit shown in FIG. 7 further includes, an access set circuit 30 for setting the access condition decided by the caching condition of the entire cache memory system, a third operating state judging circuit 33 for judging whether the cache memory (and the entire cache memory system) is in the third operating state or not, responding to set data of the access set circuit 30 and access type identifying, information outputted from the data processor 1, and an output circuit 3 which outputs the third operating state signal 6 responding to set data of the access set circuit 30 and the output of the third operating state judging circuit 33.

The access set circuit 30 includes a third latch circuit 31 for setting the instruction access and a fourth latch circuit 32 for setting the data access. The third and fourth latch circuits 31 and 32 have the same configuration as the first and second latch circuits 21 and 22, and only the contents indicated by set data are different.

The third operating state judging circuit 33 includes, a fourth logic gate 35 receiving the data signal 16 and the data-write signal 18, a third logic gate 34 for judging whether the access performed by the data processor 1 is coincided with the access set in the access set circuit 30, responding to set data of the access set circuit 30 and access type identifying information from the data processor 1, and a fifth logic gate 36 receiving outputs of the third and fourth logic gates and the non-cachable signal 17.

The third logic gate 34 includes a fourth date circuit G4 which receives the data signal 15 and set data of the third latch circuit 31 and executes AND operation of the two, a fifth gate circuit G5 which receives the data signal 16 and set data of the fourth latch circuit 32 and executes AND operation of the two for output, and a sixth gate circuit G6 which receives the outputs of the fourth and fifth gate circuits G4, G5 and execute OR operation of the two for output.

The fourth logic gate 35 executes NAND operation of the data signal 16 and the data-write signal 18 for output.

The fifth logic gate 36 executes OR operation of the outputs of the third and fourth logic gates 34, 35 and the non-cachable signal 17 for output. The fifth logic gate 36 outputs a signal "1" when, at least, one of the given signals is "0".

The output circuit 37 includes a sixth logic gate 38 receiving set data of the third and fourth latch circuits 31 and 32, and a seventh logic gate 39 receiving the outputs of the sixth logic ,ate 38 and the third operating state judging circuit 33. The sixth logic gate 38 outputs a signal "0" when data set in the third and fourth latch circuits 31 and 32 are "0". The seventh logic gate 39 generates the third operating state signal 6 of "1", when the output of the sixth logic gate :38 is "1" and the output of the third operating state judging circuit 33 is "1".

Referring to FIG. 6 and FIG. 7, the operation of the multi-cache system according to the present invention is described.

The first cache memory 2a is set to execute the caching operation responding to an instruction fetch of the data processor 1. That is, in the condition set circuit 20 of the first cache memory 2a, "1" is set in its first latch circuit 21 and "0" is set in the second latch circuit 22.

The second cache memory 2b is set to execute caching at the time of data fetch of the data processor 1. That is, in the condition set circuit 20 of the second cache memory 2b, "0" is set in the first latch circuit 21 and "1" is set in the second latch circuit 22.

Furthermore, since only the third operating state signal 6 of the first cache memory 2a is used, in the first cache memory 2a, "1" is set in the third latch circuit 31 of the access set circuit 30, and data "1" is set in the fourth latch circuit 32. At this time, since two outputs of the access set circuit 30 are both "1", the output of the sixth logic gate 38 becomes "1" and the output of the third operating state judging circuit 33 passes through the seventh logic gate 39.

Now, considering the case of executing the instruction fetch by the data processor 1. In this case, the instruction signal 15 becomes "1" and the output of the first logic gate 94 becomes "1" by set data "1" of the first latch circuit 21. Now, when the data processor 1 wants caching, the non-cachable signal 17 is "1" and the caching inhibit signal 19 outputted from the second logic gate 25 becomes "0". The first cache memory 2a executes the caching operation responding to the caching inhibit signal 19 of "0", and judges the cache miss/hit. Now, assuming that the cache miss has occurred, a cache-miss signal 5a is generated from the first cache memory 2a and given to the first logic circuit 7.

In the second cache memory 2b, since it is set in the condition set circuit 20 to cache only the data fetch, the output of the first logic gate 24 becomes "0", the caching inhibit signal 19 outputted from the second logic gate 25 becomes "1", and the caching operation in the second cache memory 2b is inhibited. That is, in this state, the second cache memory 2b is brought to a third operating state.

In the first cache memory 2a, set data of the latch circuits 31 and 32 of the access set circuit 30 are both "1", and the instruction signal 15 is "1" and the data signal 16 is "0", thus the output signal from the judging circuit 34 becomes "1" and the output of the fourth logic gate 35 is also "1". Now, since the data processor 1 is requesting the caching, the non-cachable signal 17 is "1", thus the output of the fifth logic state 36 becomes "0". Thereby, the third operating state signal 6 outputted from the seventh logic gate 39 becomes "0".

In this state, since the cache-miss signal 5a is outputted from the first cache memory 2a, a cache-miss signal 5c is generated from the first logic circuit 7 and given to the bus driver circuit 4. The bus driver circuit 4 connects the bus 10a and bus 10b responding to the cache-miss signal 5c, and the main memory 3 and the data processor 1 are made accessible therebetween. Responding to the cache-miss signal 5c, the bus driver circuit 4 also controls data transfer from the main memory 3 to the first cache memory 2a (in case of the read access).

Next, the operation of data fetch performed by the data processor 1 is described.

Now, considering that the non-cachable signal 17 is "1" and the data processor 1 is requesting caching. In this case, the first cache memory 2a is set to cache only at the instruction fetch. Thus, in the first cache memory 2a, the caching inhibit signal 19 becomes "1" and its caching operation is inhibited. That is, the first cache memory 2a is brought in the third operating state.

Since the second cache memory 2b is set to cache at the time of data fetch, the caching inhibit signal 19 is "0" and the caching operation is executed. Now, assuming that the cache miss has occurred in the second cache memory 2b, a cache-miss signal 5b is outputted and given to the first logic circuit 7.

Also, the judging circuit 33 of the first cache memory 2a outputs a signal "0", because the data-write signal 18 is "0", the data signal 16 is "1", the non-cachable signal 17 is also 1, and the output of the logic gate 34 is "1", so that the output of the fifth logic gate 36 becomes "0". Thus, the third operating state signal 6 outputted from the seventh logic gate 39 of the output circuit 37 becomes The bus driver circuit 1 connects the bus 10a and the bus 10b, responding to the third operating state signal 6 of "0" and the cache-miss signal 5c of "1" outputted from the first logic circuit 7, makes the main memory 3 and the data processor 1 accessible therebetween, and controls and executes data transfer to the second cache memory 2b.

When the cache hit has occurred in the first cache memory 2a or the second cache memory 2b at the time of read access, the cache-miss signal 5c is not generated, and hence, the bus driver circuit 4 keeps the bus 10a and bus 10b in a separate state, and allows the data cache memory in which the cache-hit has occurred and the data processor 1 (at this time, the cache memory 2a is outputting the third operating state signal 6 of "0").

When the non-cachable signal 17 becomes "0" and the data processor 1 does not request caching at the time of read access, the output of the judging circuit 33 becomes "1" and the third operating state signal 6 outputted from the output circuit 37 becomes "1". Since the cache-miss signal is not generated from the first and second cache memories 2a and 2b at this time (one is in the third operating state), the bus driver circuit 4 connects the bus 10a and the bus 10b responding, to the third operating state signal 6 of "1", and allows the data transfer between the data processor 1 and the main memory 3 in a desired unit.

Next, the operation of data write by the data processor 1 is described. When writing data, both the data signal 16 and the data-write signal 18 become "1" and the instruction signal 15 is "0". At this time, in the first cache memory 2a, the caching inhibit signal 19 becomes "1", the caching operation is inhibited and the third operating state is realized.

In the first cache memory 2a, the output of the fourth logic gate 35 included in the judging circuit 33 becomes "0", and the output of the fifth logic gate 36 becomes "1". Responding to the output signal from the judging circuit 33, the third operating state signal 6 of "1" is outputted from the seventh logic gate 39 of the output circuit 37.

In the second cache memory 2b, the caching inhibit signal 19 is "0" and the caching operation is performed.

Now, since the third operating state signal 6 is "1", the bus driver circuit 4 connects the bus 10a and bus 10b, and writes data from the data processor 1 into a predetermined location in the main memory 3. At this time, data is also written into the second cache memory 2b (in the case of write hit). Usually, the data processor 1 only writes data into the main memory 3 irrespective of the cache hit/miss, and whether or not to write data into the cache memory simultaneously at that time is decided by the write-through method or the write-back method whichever being used then. Hereupon, the case of write-through method, whereby data is written into the corresponding cache memory as well as the main memory 3 at the time of write hit, is estimated.

In the above-mentioned configuration, the bus driver circuit 4 assumes the case of writing write data into the main memory 3 by the data processor 1 irrespective of the write hit/miss, and for defining the difference between a bus cycle when accessing the main memory 3 by the data processor 1, and a bus cycle transferring data to the cache memory from the main memory 3 at the time of cache miss, the third operating state signal 6 is used.

As the above-mentioned configuration, by using data set in the access set circuit in one of the cache memories, outputting the third operating state signal only from this cache memory and controlling the operation of the bus driver circuit 4, the second logic circuit having the conventional configuration as shown in FIG. 2 is not necessary, thus the bus driver circuit 4 can execute the bus control rapidly.

Next, appropriateness of caching conditions set in respective cache memories and access conditions of the entire system, namely, combination of set data of the condition set circuit 20 and set data of the access set circuit, for enabling control of the third operating state of the entire system by one cache memory is described.

Figure 8:
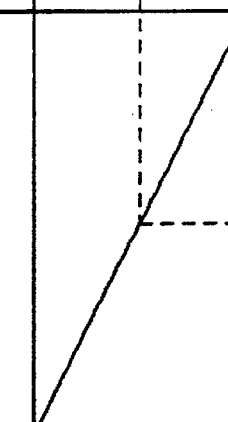
FIG. 8 is a table showing the bus operating combination as a function of set data of a condition set circuit and an access set circuit of a multi-cache system of the present invention.

FIG. 8 is a table showing permissible combination of set data of the condition set circuit and set data of the access set circuit and the system operation performed then.

In FIG. 8, data set in the condition set circuit 20 are shown in an upper column and set data of the access set circuit are shown in a left column of the table. (00) of a first row of the condition set circuit 20 shows the case where latched data in the first latch circuit 21 is "0" and latched data in the second latch circuit 22 is "0". In this case, the cache memory 2 is in a state where the caching operation is always not performed.

A second row in the upper column of the table shows that latched data in the first latch circuit 21 is "0" and latched data in the second latch circuit 22 is "1", wherein the cache memory 2 operates as a data cache which caches the data.

A state of third row in the upper column of the table represents that, the first latch circuit 21 latches "1", the second latch circuit 22 latches "0" and the cache memory 2 operates as an instruction cache which caches the instruction.

A fourth row in the upper column of the table represents a state, where latched data in the first latch circuit 21 and the second latch circuit 22 are "1", and the cache memory 2 caches both the instruction and data without distinguishing the two.

In a state of the left-side access set circuit shown in FIG. 8, a first line shows the state where the third latch circuit 31 and the fourth latch circuit 32 latch "0", the state representing the system configuration not using the third operating state signal 6. That is, this shows the state of system configuration as shown in FIG. 2.

A state of a left-side second line, wherein the third latch circuit 31 latches "0" and the fourth latch circuit 32 latches "1", represents the state where all of the cache memories 2 included in the system operate as the data caches which cache data.

A third line in the left column represents a state where the third latch circuit 31 latches "1" and the fourth latch circuit 32 latches "0", the state representing all of the cache memories 2 included in the system operate as the instruction caches which cache the instruction.

A left-side fourth line of the table shows a state where both the third and fourth latch circuits 31 and 32 latch "1", the state showing the system configuration wherein the cache memory system caches both the instruction and data.

In the table shown in FIG. 8, symbols indicated at the points of intersection of the rows showing set data of the condition set circuit and lines showing set data of the access set circuit indicate whether or not these combinations are appropriate. In the table shown in FIG. 8, symbol "–" indicates the case of system configuration as shown in FIG. 2, wherein the third operating state signal 6 is not used when set data of the condition set circuit 20 and set data of the access set circuit 30 are combined, that is, the combination is used when it is not possible to judge cachable or not rapidly just by access type identifying information from the data processor 1.

The state of combination indicated by symbol "Δ" shows that, the cache memory system has to be operated even when the cache memory does not execute the caching operation. In this state, since it is necessary to start the bus driver circuit 4 and connect the data processor 1 and the main memory 3 responding to any access from the data processor 1, the third operating state signal 6 must be used.

The combinations indicated by symbol 0" shows that this is the desired state of combination, wherein caching condition requested by the cache memory system coincide with each other.

Symbol "x" is the case where combination of respective set conditions of the condition set circuit 20 and the access set circuit 30 is different from the desired state, and shows the case where undesirable combination is realized. Since the cache miss always occurs in this case, it is not possible to utilize a quick-access cache memory system effectively.

Now, a specific example is described.

Considering the case where the content of the first latch circuit 21 of the condition set circuit 20 is "1", latched data in the second latch circuit 22 is "0", latched data in the third latch circuit 31 of the access set circuit 30 is "0" and latched data in the fourth latch circuit 32 is "1". At this time, from the table shown in FIG. 8, the symbol indicated at this point of intersection is "X", which shows the state of undesirable combination. At this time, the cache memory 2 operates to cache when the data processor 1 performs the instruction fetch, and in the state where a copy data to be accessed is held therein (cache hit), outputs desired data to the bus 10a.

Meanwhile, as the operation of the entire cache system, by the set condition of the access set circuit 30, the caching operation is executed when the data processor 1 fetches data. Thus, in this case, when the data processor 1 fetches the instruction, the third operating state signal 6 is to be outputted. By this third operating state signal 6, the bus driver circuit 4 makes data to the main memory +e,fra cir +ee accessible and enables the instruction fetch of the data processor 1 to the main memory 3.

However, at this time, the cache memory 2 outputs requested data on the bus 10a at the time of cache hit and read data from the main memory 3 is transmitted to the bus 10a by the bus driver circuit 4, resulting in bus collision. When such bus collision has occurred, not only the data is destroyed, but since an excessive electric current flows through the bus, the system (data processor or cache memory, and bus driver circuit and main memory) may be destroyed.

In order to avoid such state, when combination of "X" is set in the table shown in FIG. 8, the cache memory 2 itself is controlled not to operate. That is, when such combination has occurred, the caching inhibit signal 19 is generated or the third operating state signal 6 is not generated so as not to operate the cache memory itself and to prevent the bus collision. In the configuration shown in FIG. 7, when "0" is set in the third and fourth latch circuits 31 and 32, the third operating state signal is always inhibited to be generated, and when "1" is set in either the latch circuits 31 or 32, the third operating state signal 6 is generated responsive to the output of the third operating state judging circuit 33. Thus, it is believed that the bus collision may occur by the undesirable combination in the case where the circuit configuration remains as it is. Therefore, next, the configuration including a function to judge whether combination of the set condition of the condition set circuit and the set condition of the access set circuit is preferable or not is described.

Figure 9:
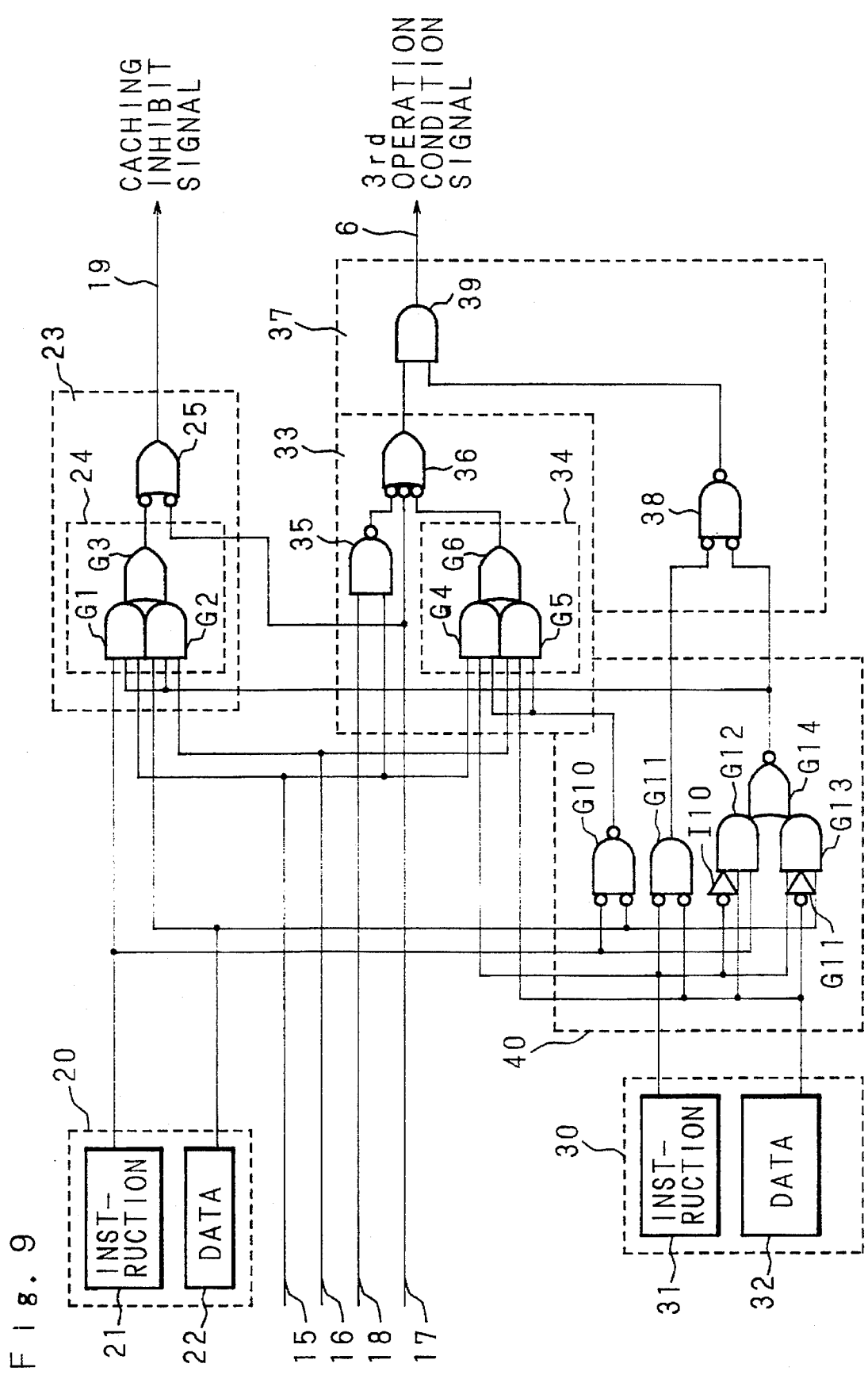
FIG. 9 is a circuit diagram showing a specific example of configuration of a third operating state signal generating circuit, having a combination judging function capable of preventing bus collisions of a multi-cache system of the present invention.

FIG. 9 is a view showing the configuration of the third operating state signal generating circuit including the judging function of condition combination, wherein parts corresponding to the configuration shown in FIG. 7 are designated by the same reference numerals.

The third operating state signal generating circuit 33 shown in FIG. 9 includes a judging circuit 40 provided between the access set circuit 30 and the third operating state judging circuit 33 and the output circuit 37. The judging circuit 40 controls operations of the NCA judging circuit 23, the third operating state judging circuit 30 and the output circuit 37 according to the rules shown in FIG. 8.

The judging circuit 40 includes: a gate circuit G10 which receives set data of the condition set circuit 20; a gate circuit G11 which receives set data of the access set circuit 30; a gate circuit G12 which receives latched data in the first latch circuit 21 of the condition set circuit 20, latched data in the fourth latch circuit 32 of the access set circuit 30 and latched data in the third latch circuit 31 via an inverter I10; a gate circuit G13 which receives latched data in the second latch circuit 92 of the condition set circuit 20, latched data in the third latch circuit 31 of the access set circuit 30 and data via an inverter I11 to latched data in the fourth latch circuit 32; and a gate G14 which receives outputs of the gate circuits G12 and G13. The output of the gate circuit G10 is given to fourth and fifth gate circuits provided at input of the third logic gate 34. The output of the gate circuit 14 is given to inputs of first and second gate circuits of the first logic gate 24. And hence, different from the configuration shown in FIG. 7, the gate circuits G1, G2, G4 and G5 are the three-input gate circuits.

The output circuit 37 includes a gate circuit 39 consisting of a two-input AND circuit and a logic gate 38 which executes OR operation. The gate circuit 38 receives the output of the gate circuit G11 and the output of the gate circuit G14. The gate circuit 39 receives the output of the logic gate 38 and the output of the logic gate 36, and outputs the third operating state signal 6.

Next, the operation is described.

When its inputs are both "0", the gate circuit G10 outputs a signal "0" and gives it to the third logic gate 34. Thus, when set data of the condition set circuit 20 are both "0", the output of the third logic gate 34 becomes "0" and the output of the third operating state judging circuit 33 becomes "1".

When latched data in the third and fourth latch circuits 31 and 32 of the access set circuit 30 are both "0", the output of the gate circuit G11 becomes "1", the output of the third logic gate 34 becomes "0" and the output of the third operating state judging circuit 33 becomes "1". At this time, the output of the gate circuit 14 becomes "1". Thus, in this case, the third operating state signal 6 from the gate circuit 39 included in the output circuit 37 always becomes "1" irrespective of the access type, as the output of the gate circuit 38 is "1". The cache inhibit signal 19 outputted from the judging circuit 23 at this time is decided by the access type of the data processor 1 and the set condition of the condition set circuit 20. This state is an unused state and is inhibited.

Considering the case where latched data in the first latch circuit 21 of the condition set circuit 90 is "0", latched data in the second latch circuit 22 is "1", latched data in the third latch circuit 31 of the access set circuit 30 is "1" and latched data in the fourth latch circuit 32 is "0". In this case, outputs of the gate circuits G11 and G14 become "0" and the third operating state signal 6 outputted from the gate circuit 39 of the output circuit 37 becomes "0" as the output of the gate circuit 38 is "0".

The output of the gate circuit G14 of the judging circuit 40 is "0" and outputs of the gate circuits G1 and G2 of the first logic gate 24 become "0", thus a signal "0" is outputted from the first logic gate 24 and the cache inhibit signal 19 becomes "1".

Considering the case where "0" is set in the first latch circuit 21, "1" in the second latch circuit 22, "1" i] the third latch circuit 31 and "0" in the fourth latch circuit 32. In this case, the output of the gate circuit G11 becomes "0" and the output of the gate circuit 14 also becomes "0". Thus, the output of the gate circuit 38 becomes "0" and the third operating state signal 6 outputted from the output circuit 37 is "0". Also, at this time, the output of the first logic gate 24 becomes "0" and the cache inhibit signal 19 becomes "1".

Considering the case where "1" is set in the first and second latch circuits 21 and 22 of the condition set circuit 20, and "1" is set in either of the third and fourth latch circuits 31 and 32 of the access set circuit 30 and "0" in the other. At this time, in the same way as the above-mentioned case, outputs to the gate circuits G11 and G14 become "0" and the third operating state signal 6 is 0", thus the cache inhibit signal 19 becomes "1" as the output of the gate circuit G14 becomes "0".

When combination of condition (indicating access type) data set in the condition set circuit 20 and the access set circuit 30 is desirable, or in the case of combination shown by "0" in the table shown in FIG. 8, outputs of the gate circuits G14 and 38 become "1", and the same operation as the third operating state signal generating circuit shown in FIG. 7, is performed, thereby the operation according to the set condition is performed.

When "0" is set in the first and second latch circuits 21 and 22, the output of the gate circuit 10 becomes "0", the output of the gate circuit G14 becomes "1" and the output of the gate circuit 38 becomes "1", thus the cache inhibit signal 19 becomes "1" and the third operating state signal 6 becomes "1".

Thus, when combination of set data of the condition set circuit 20 and the access set circuit 30 is judged according to the rules as shown in FIG. 8, by using the circuit configuration as shown in FIG. 9, the bus collision is avoided and the reliable bus control can be executed.

In the multi-cache system, by the aforementioned configuration, the third-operating state signal 6 is outputted only when all of the cache memories are in the third operating state, and the operating state of all the cache memories can be judged by the third state signal from one cache memory.

As mentioned heretofore, according to the present invention, since the caching operation of the cache memory is controlled responsive to the access type identifying, signal outputted from the data processor, and the function for outputting the signal showing the third operating state, when the cache memory performs a third operation which is different from the cache-hit operation and the cache-miss operation at the time of read access, is provided on the cache memory so as to control the bus driver circuit by the third operating state signal, operation modes of the cache memory can be judged by the time required for decoding or multiplexing ring information outputted from the data processor, and the operation of the bus driver circuit can be controlled rapidly, thereby it is possible to obtain the cache memory capable of realizing a quick data access.

In the cache memory system consisting of a plural number of cache memories, since the operation of the bus driver circuit is controlled by using only the third operating state signal from one cache memory, a logic circuit for judging the operating state of the entire cache system in the multi-cache system is not necessary, thereby a cost can he reduced and the rapid bus control of the bus driver circuit can be realized.

Also, since a judging circuit for judging desirable or undesirable conditions of the condition set circuit and the access set circuit is provided in the cache memory, even when the user made a mistake in setting the access set circuit of the cache memory, the third operating state signal is not generated in that state, thus bus collisions can be prevented and a cache memory system which is very safe and has no device destruction can be realized.

As this invention may be embodied in several forms without departing from the spirit of essential characteristics thereof, the present embodiment is therefore illustrative and not restrictive, since the scope of the invention is defined by the appended claims, and all changes that fall within meets and bounds of the claims, or equivalence of such meets and bounds thereof are therefore intended to be embraced by the claims.

What is claimed is:

1. A cache memory connected between a main memory and a data processor which data processor outputs an access type identifying signal at the time of access to said main memory, and operating in a first mode, in which a copy of data requested by the data processor is present in cache memory, and in a second mode, in which data requested by said data processor is not present in cache memory, comprising:

caching condition access set means for setting the cache memory to one of a plurality of caching condition accesses in response to the access type identifying signal of said data processor, the cache memory being operable in one of said first mode and said second mode for each caching condition access set;

state discriminating means for discriminating a third mode, different from said first and second modes, in the case where said access type identifying signal output from said data processor does not coincide with the caching condition access set by said caching condition access set means; and operating state signal generating means for generating an operating state indicating signal in response to the said state discriminating means discriminating said third mode.

2. A cache memory as set forth in claim 1, wherein the access type is data read access, and the caching condition access is one of cache only when the data processor outputs a data read access and cache only when the data processor outputs an instruction read access.

3. A cache memory as set forth in claim 1, wherein the access type is instruction read access, and the caching condition access is one of cache only when the data processor outputs a data read access and cache only when the data processor outputs an instruction read access.

4. A cache system, comprising:

a main memory;

a data processor which outputs an access type identifying signal showing an access type at the time of access to said main memory;

a cache memory connected between said main memory and said data processor; and a bus driver connected to said cache memory through a first bus, and to said main memory through a second bus; wherein said cache memory operates in a first mode, in which said cache memory outputs data requested in response to a read access request from said data processor when a copy of storage contents requested from said main memory is present in said cache memory, and in a second mode, in which, responding to the read access from said data processor, data requested by said data processor is accessed from said main memory, when a copy of storage contents of said main memory is not present in said cache memory, stored in said cache memory, and read by said data processor by connecting said first bus and said second bus by said bus driver, said cache system further comprising:

caching condition access set means for setting the cache memory to one of a plurality of caching condition accesses in response to the access type identifying signal of said data processor to one of said first mode and said second mode;

state discriminating means for discriminating a third mode, different from said first and second modes, in the case where said access type identifying signal output from said data processor does not coincide with the caching condition access set by said caching condition access set means; and operating state signal generating means for generating an operating state indicating signal in response to the said state discriminating means discriminating said third mode; whereby said bus driver connects said first bus and said second bus, when said operating state indicating signal is given from said operating state signal generating means.

5. A cache-system as set forth in claim 4, wherein the access type is data read access, and the caching condition access is one of cache only when the data processor outputs a data read access and cache only when the data processor outputs an instruction read access.

6. A cache system as set forth in claim 4, wherein the access type is instruction read access, and the caching condition access is one of cache only when the data processor outputs a data read access and cache only when the data processor outputs an instruction read access.

7. A cache memory connected between a main memory and a data processor which outputs an access type identifying signal showing an access type at the time of access to said main memory, and operating in a first mode, in which data requested by said data processor is output in response to a read access from said data processor when a copy of storage contents of said main memory is present in cache memory, and in a second mode, in which data requested by said data processor is accessed from said main memory and stored in cache memory when a copy of storage contents of said main memory is not present in cache memory, comprising:

caching condition access set means for setting the a caching condition access of the cache memory to a first state and a second state in response to the access type identifying signal;

access set means for setting the cache memory to a third state corresponding to a third mode, different from said first mode and said second mode;

judging means for judging whether an access request from said data processor can be satisfied in either said first mode or said second mode by comparing said access type identifying signal output from said data processor and the caching condition access set by said condition access set means;

state discriminating means for discriminating said third state in the case where said access type identifying signal output from said data processor and the caching condition access set by said caching condition access set means do not coincide; and operating state signal generating means for generating a third state indicating signal in response to the output signal from said state discriminating means.

8. A cache memory as set forth in claim 7, wherein the access type is data read access, and the caching condition access is one of cache only when the data processor outputs a data read access and cache only when the data processor outputs an instruction read access.

9. A cache memory as set forth in claim 7, wherein the access type is instruction read access, and the caching condition access is one of cache only when the data processor outputs a data read access and cache only when the data processor outputs an instruction read access.

10. A cache system, comprising:

a main memory;

a data processor which outputs an access type identifying signal showing an access type at the time of access to said main memory;

a plural number of cache memories connected between said main memory and said data processor; and a bus driver connected to said plural number of cache memories through a first bus, and to said main memory through a second bus;

wherein said plural number of cache memories respectively operate in a first mode, in which said cache memories output data requested to be accessed by said data processor through said first bus, when a copy of storage contents of data requested by said data processor from said main memory is present in said cache memories, and in a second mode, in which, responding to a read access of said data processor, data requested to be accessed by said data processor is accessed from said main memory when a copy of storage contents of said main memory is not present in said cache memories, stored in said cache memories, and read by said data processor by connecting said first bus and said second bus by said bus driver;

said cache system further comprising:

caching condition access set means for each of said plural number of cache memories for selectively setting caching condition access for one of said plural number of cache memories to a first state corresponding to said first mode and a second state corresponding to said second mode;

access set means for setting the said cache system to a third state corresponding to a third mode, different from said first and second modes;

judging means for judging whether an access request from said data processor can be satisfied or not in, at least, either said first mode or said second mode so as to operate the respective cache memories in either of the modes by comparing said access type identifying signal outputted from said data processor and the caching condition access type set by said condition set means;

state discriminating means for discriminating said third state by comparing said access type identifying signal output from said data processor with the caching condition access set by said caching condition access set means to determine if they coincide; and operating state signal generating means for generating a third state indicating signal in response to an output signal from said state discriminating means;

whereby said bus driver connects said first bus and said second bus when said third state indicating signal is given from said operating state signal generating means.

11. A cache system as set forth in claim 10, wherein the access type is data read access, and the caching condition access is one of cache only when the data processor outputs a data read access and cache only when the data processor outputs an instruction read access.

12. A cache system as set forth in claim 10, wherein the access type is instruction read access, and the caching condition access is one of cache only when the data processor outputs a data read access and cache only when the data processor outputs an instruction read access.

13. A cache system, comprising:

a main memory;

a data processor which outputs an access type identifying signal showing an access type at the time of access to said main memory;

a plural number of cache memories connected between said main memory and said data processor; and a bus driver connected to said plural number of cache memories through a first bus, and to said main memory through a second bus;

wherein said respective plural number of cache memories operates in a first mode, in which said cache memories output data requested by said data processor through said first bus when a copy of storage contents of said main memory is present in said cache memories in response to a read access from said data processor, and in a second mode, in which, responding to a read access of said data processor, data requested to be accessed by said data processor is accessed from said main memory when a copy of storage contents of said main memory is not present in said cache memories, stored in said cache memories, and read by said data processor by connecting said first bus and said second bus by said bus driver, said cache system further comprising;

caching condition access set means for setting the caching condition access for one of said plural number of cache memories to a first state corresponding to said first mode and to a second state corresponding to said second mode;

access set means for setting said cache system to a third state corresponding to a third mode, different from said first and second modes;

combination judging means for judging whether a combination of the access set by said caching condition access set means and the third state set by said access set means coincide or not;

judging means for judging whether a requested access from said data processor can be satisfied, at least, either in said first mode or said second mode, according to the access type identifying signal outputted from said data processor, the caching condition access set by said caching condition access set means and the judging result by said combination judging means, so as to operate said respective cache memories in either of said first mode or said second mode;

state discriminating means for comparing said access type identifying signal output from said data processor and the third state set by said access set means to determine if they coincide; and operating state signal generating means for generating a third state indicating signal in response to the output signal from said state discriminating means;

whereby said bus driver connects said first bus and said second bus, when said operating state indicating signal is given from said operating state signal generating means.

14. A cache system as set forth in claim 13, wherein the access type is data read access, and said caching condition access is one of cache only when the data processor outputs a data read access and cache only when the data processor outputs an instruction read access.

15. A cache system as set forth in claim 13, wherein the access type is instruction read access, and said caching condition access is one of cache only when the data processor outputs a data read access and cache only when the data processor outputs an instruction read access.

* * * * *